United States Patent
Foley et al.

(10) Patent No.: US 11,287,810 B2
(45) Date of Patent: *Mar. 29, 2022

(54) INDUSTRIAL PROCESS CONTROL COORDINATION AND IMPLEMENTATION UTILIZING A FACILITY PRESCRIPTION FROM A REMOTE SERVER

(71) Applicant: CrossnoKaye, Santa Barbara, CA (US)

(72) Inventors: Thomas Foley, Goleta, CA (US); Bryan Kaye, Santa Barbara, CA (US); Daniel Walsh, Santa Barbar, CA (US); Jesse Crossno, Santa Barbara, CA (US)

(73) Assignee: Crossno & Kaye, Inc., Santa Barbara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/691,605

(22) Filed: Nov. 22, 2019

(65) Prior Publication Data

US 2020/0110396 A1 Apr. 9, 2020

Related U.S. Application Data

(63) Continuation of application No. 16/428,944, filed on May 31, 2019, now Pat. No. 10,503,161.

(60) Provisional application No. 62/742,753, filed on Oct. 8, 2018.

(51) Int. Cl.
*G05B 19/418* (2006.01)
*G05B 23/02* (2006.01)

(52) U.S. Cl.
CPC ..... *G05B 23/0286* (2013.01); *G05B 19/4184* (2013.01); *G05B 19/4185* (2013.01)

(58) Field of Classification Search
CPC .................................................. G05B 19/418
USPC .......................................................... 700/95
See application file for complete search history.

(56) References Cited

U.S. PATENT DOCUMENTS

| | | |
|---|---|---|
| 5,984,502 A | 11/1999 | Calder |
| 2011/0204720 A1 | 8/2011 | Ruiz et al. |
| 2011/0298596 A1 | 12/2011 | Warrick |
| 2012/0245744 A1 | 9/2012 | Prosser et al. |
| 2016/0177941 A1 | 6/2016 | Singal et al. |
| 2016/0006245 A1 | 7/2016 | Chow et al. |

(Continued)

OTHER PUBLICATIONS

U.S. Office Action in U.S. Appl. No. 16/428,944, dated Aug. 2, 2019, 13 pgs.

(Continued)

*Primary Examiner* — Suresh Suryawanshi

(57) ABSTRACT

Systems and methods for industrial process control coordination and implementation are disclosed. In some embodiments, a facility coordinator may be configured to: receive a facility prescription from a remote server; translate the facility prescription into one or more commands understood by one or more of a plurality of controllable devices; communicate the one or more commands to the one or more controllable devices; receive sensor data from one or more of a plurality of environmental sensors; determine based on the sensor data whether an aspect of an environment or one or more of the controllable devices violates one or more constraints; and in the event operational, safety, or physical constraints are or will soon be violated, determine a corrective action and send corrective action commands to one or more of the plurality controllable devices.

19 Claims, 7 Drawing Sheets

(56) References Cited

U.S. PATENT DOCUMENTS

| | | |
|---|---|---|
| 2016/0274552 A1 | 9/2016 | Strohmenger et al. |
| 2016/0329706 A1 | 11/2016 | Deligiannis et al. |
| 2017/0052518 A1* | 2/2017 | Wang .................... G05B 11/01 |
| 2017/0102694 A1* | 4/2017 | Enver .............. G05B 19/41875 |
| 2017/0364060 A1* | 12/2017 | Nikhra ............... G05B 19/4184 |
| 2018/0024519 A1 | 1/2018 | Peluso et al. |
| 2018/0027071 A1 | 1/2018 | Toepke et al. |
| 2018/0356811 A1* | 12/2018 | Trenchard ............ G05B 13/041 |

OTHER PUBLICATIONS

U.S. Notice of Allowance in U.S. Appl. No. 16/428,944, dated Oct. 30, 2019, 8 pgs.

International Search Report and Written Opinion as issued in connection with International Patent Application No. PCT/US2019/060282, dated Mar. 3, 2020, 7 pages.

U.S. Office Action in U.S. Appl. No. 16/658,016, dated Mar. 5, 2020, 13 pgs.

Goldin et al., Cloud computing for big data analytics in the Process Control Industry, 2017, IEEE, pp. 11 (Year: 2017).

U.S. Office Action in U.S. Appl. No. 16/658,016, dated Apr. 22, 2020, 19 pgs.

\* cited by examiner

INDUSTRIAL PROCESS CONTROL COORDINATION AND IMPLEMENTATION UTILIZING A FACILITY PRESCRIPTION FROM A REMOTE SERVER

CROSS-REFERENCE TO RELATED APPLICATIONS

This application claims priority to U.S. Provisional Patent Application No. 62/742,753 filed Oct. 8, 2018, titled "Control platform and associated software modules for optimizing performance and reducing energy costs of facilities, plants, and buildings," which is incorporated by reference in its entirety.

BACKGROUND

Many industrial control systems are antiquated and are not designed to interface with modern energy strategies. For instance, to implement a rudimentary energy strategy may be slow, expensive, or require hardware or infrastructure changes. In addition, many current control systems are built on archaic programming languages and may not facilitate cloud connectivity, real-time data analytics, edge computing, or machine learning strategies. Moreover, many current control systems may not be designed to rapidly vary operational variables or were instead designed to maintain static process setpoints.

SUMMARY

Embodiments of the invention include a system that includes a plurality of controllable devices; a plurality of environmental and device sensors configured to measure aspects of a facility environment and device states; a facility coordinator in communication with the plurality of controllable devices and the plurality of environmental sensors. In some embodiments, the facility coordinator may be configured to: receive a facility prescription from a remote server; translate the facility prescription into one or more commands understood by one or more of the plurality of controllable devices; communicate the one or more commands to the one or more controllable devices; receive sensor data from one or more of the plurality of environmental sensors; determine, based on the sensor data, whether the environment or one or more of the controllable devices violates one or more constraints, which may include constraints defined by linear or non-linear combinations of facility or environmental readings; and in the event the environment or one or more of the controllable devices violates one or more constraints, determine a corrective action and send corrective action commands to one or more of the plurality of sensors.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

Some embodiments may include a system comprising: a plurality of controllable devices; a plurality of sensors configured to measure aspects of a facility environment; and a facility coordinator in communication with the plurality of controllable devices and the plurality of environmental sensors. In some embodiments, the facility coordinator can be configured to: receive a facility prescription from a remote server; translate the facility prescription into one or more commands understood by one or more of the plurality of controllable devices; communicate the one or more commands to the one or more controllable devices; receive sensor data from one or more of the plurality of sensors; determine based on the sensor data whether an aspect of an environment or one or more of the controllable devices violates one or more constraints; and in the event the environment or one or more of the controllable devices violates one or more constraints, determine a corrective action command and send the corrective action command to one or more of the plurality controllable devices;

In some embodiments, the one or more of the plurality of controllable devices implements the corrective action command.

In some embodiments, the facility prescription comprises a first set point corresponding to an environmental condition to be met by operation of the plurality of controllable devices.

In some embodiments, the facility prescription comprises a second set point corresponding to either an environmental condition or an operational condition to be met by operation of the plurality of controllable devices.

In some embodiments, the facility prescription includes two or more environmental set points or operational set points to be met by operation of the plurality of controllable devices.

In some embodiments, the facility prescription comprises one or more set points corresponding to one or more environmental condition or operational condition, and the corrective action comprises adjusting the one or more set points.

In some embodiments, the plurality of controllable devices comprises at least one of an evaporator, a condenser, a plurality of fans, a vessel, and a pump; and wherein the plurality of sensors comprise at least one of a thermometer and a pressure sensor.

In some embodiments, the prescription comprises a temperature set point; the plurality of controllable devices comprises an evaporator and an evaporator fan; and translating the facility prescription into one or more commands comprises translating the temperature set point into a command that will change a fan speed of the evaporator fan.

In some embodiments, the plurality of controllable devices comprises a vessel; the plurality of sensors comprises at least one vessel pressure sensor or vessel level sensor; and in the event the vessel pressure or vessel level is greater than a predetermined value, setting the corrective action command to a command that decreases the evaporator fan speed.

In some embodiments, the facility coordinator is configured to: store the sensor data and communicate the sensor date to the scheduler.

In some embodiments, one or more of the one or more controllable devices applies the one or more commands.

In some embodiments, the facility prescription comprises a first set point and a second set point, wherein the second set point has priority over the first set point.

In some embodiments, the corrective action command comprises a first corrective action associated with the first set point and a second corrective action associated with the second set point and the second corrective action is applied before the first corrective action.

In some embodiments, the one or more constraints comprise a first constraint and a second constraint, wherein the second constraint has priority over the first constraint.

In some embodiments, the one or more constraints comprise a first constraint and the facility prescription comprises a first set point, wherein first constraint has priority over the first set point.

Some embodiments include a method comprising: receiving a facility prescription from a remote server; translating the facility prescription into one or more commands understood by one or more of a plurality of controllable devices; communicating the one or more commands to the one or more controllable devices; receiving sensor data from one or more of a plurality of sensors; determining based on the sensor data whether an aspect of an environment or one or more of the controllable devices violates one or more constraints; and in the event the environment or one or more of the controllable devices violates one or more constraints, determining a corrective action and sending corrective action commands to one or more of the plurality controllable devices.

In some embodiments, the facility prescription comprises a first set point corresponding to an environmental condition to be met by operation of the plurality of controllable devices.

In some embodiments, the facility prescription comprises a second set point corresponding to either an environmental condition or an operational condition to be met by operation of the plurality of controllable devices.

In some embodiments, the facility prescription includes two or more environmental set points or operational set points to be met by operation of the plurality of controllable devices.

In some embodiments, the facility prescription comprises one or more set points corresponding to one or more environmental condition or operational condition, and the corrective action comprises adjusting the one or more set points.

In some embodiments, the facility prescription comprises a first set point and a second set point, wherein the second set point has priority over the first set point.

In some embodiments, the prescription comprises a temperature set point; the plurality of controllable devices comprises an evaporator and an evaporator fan; and translating the facility prescription into one or more commands comprises translating the temperature set point into a command that will increase a fan speed of the evaporator fan.

In some embodiments, the plurality of controllable devices comprises a vessel; the plurality of sensors comprises at least one vessel pressure sensor or vessel level sensor; and in the event the vessel pressure or vessel level is greater than predetermined value, setting the corrective action command to a command that decreases the evaporator fan speed.

Some embodiments include a non-transitory, tangible computer readable medium communicatively coupled to the one or more processors and storing executable instructions executable by the one or more processors to perform the methods described in this document.

Some embodiments include a system comprising: a device in communication with a plurality of controllable devices and a plurality of sensors. In some embodiments, the device configured to: receive a facility prescription from a remote server; translate the facility prescription into a translated prescription that can be applied to the plurality of controllable devices; determine whether the translated prescription will violate a constraint associated with a first controllable device of the plurality of controllable devices; in the event the translated prescription is determined to violate the constraint associated with the first controllable device, modify the translated prescription to ensure that the application of the translated prescription will not violate the constraint associated with the first controllable device; and communicate the translated prescription to the first controllable device.

In some embodiments, the system may also include the first controllable device, and wherein the first controllable device executes the command.

In some embodiments, communicating the translated prescription to the first controllable device further comprises determining a command that is executable by the first controllable device and communicating the command to the first controllable device.

In some embodiments, the device is further configured to: receive sensor data from one or more of the plurality of environmental sensors; determine based on the sensor data whether an aspect of an environment or one or more of the controllable devices violates a second constraint; and in the event the environment or one or more of the controllable devices violates a second constraint, determine a corrective action for at least one of the one or more controllable devices and communicate the corrective action to at least one of the one or more controllable devices.

BRIEF DESCRIPTION OF THE FIGURES

These and other features, aspects, and advantages of the present disclosure are better understood when the following Detailed Description is read with reference to the accompanying drawings.

These and other features, aspects, and advantages of the present disclosure are better understood when the following Detailed Description is read with reference to the accompanying drawings.

DETAILED DESCRIPTION

Systems and methods are disclosed that can, for example, implement an energy-centric methodology or implement a cloud-based control system. Some embodiments may be able to use forecasted or predicted weather or electricity pricing data, compute the cooling power of an evaporator, estimate the cooling required to satisfy operational requirements, predict liquid $NH_3$ levels given varying system parameters, or control the power draw of individual components. Some embodiments may implement policies or prescriptions provided from a remote scheduler to implement such features.

In some embodiments, a facility coordinator may include a buffering protocol that can allow information (or prescriptions or constraints) to be stored locally and synchronized with cloud databases such as the scheduler. A prescription may, for example, include one or more set points or equipment states to be applied or executed at a specific industrial facility. A prescription may or may not be time based. In some embodiments, various modules within either or both a facility coordinator or a remote scheduler may strive to optimize a specific metrics of a facility. In some embodiments, either or both a facility coordinator or a remote scheduler may balance the demands of the various modules or selecting the process states that optimize the economics of the facility.

In some embodiments, process constraints or prescriptions may be dictated by a cloud-based scheduler. Yet, a facility coordinator may use processes or methods (e.g., a hierarchy of constraints) to override or modify one or more prescriptions that may be less critical to maintain the facility within some constraints. For example, a scheduler may prescribe a specific fan speed and dictate a temperature constraint within a cooler. The coordinator may override the fan speed prescription in the event the temperature constraint has been reached or is about to be reached. As another example, the facility coordinator may translate a prescription received from the scheduler so that the prescription can be executed by the specific controllable devices at the specific facility.

Figure 1:
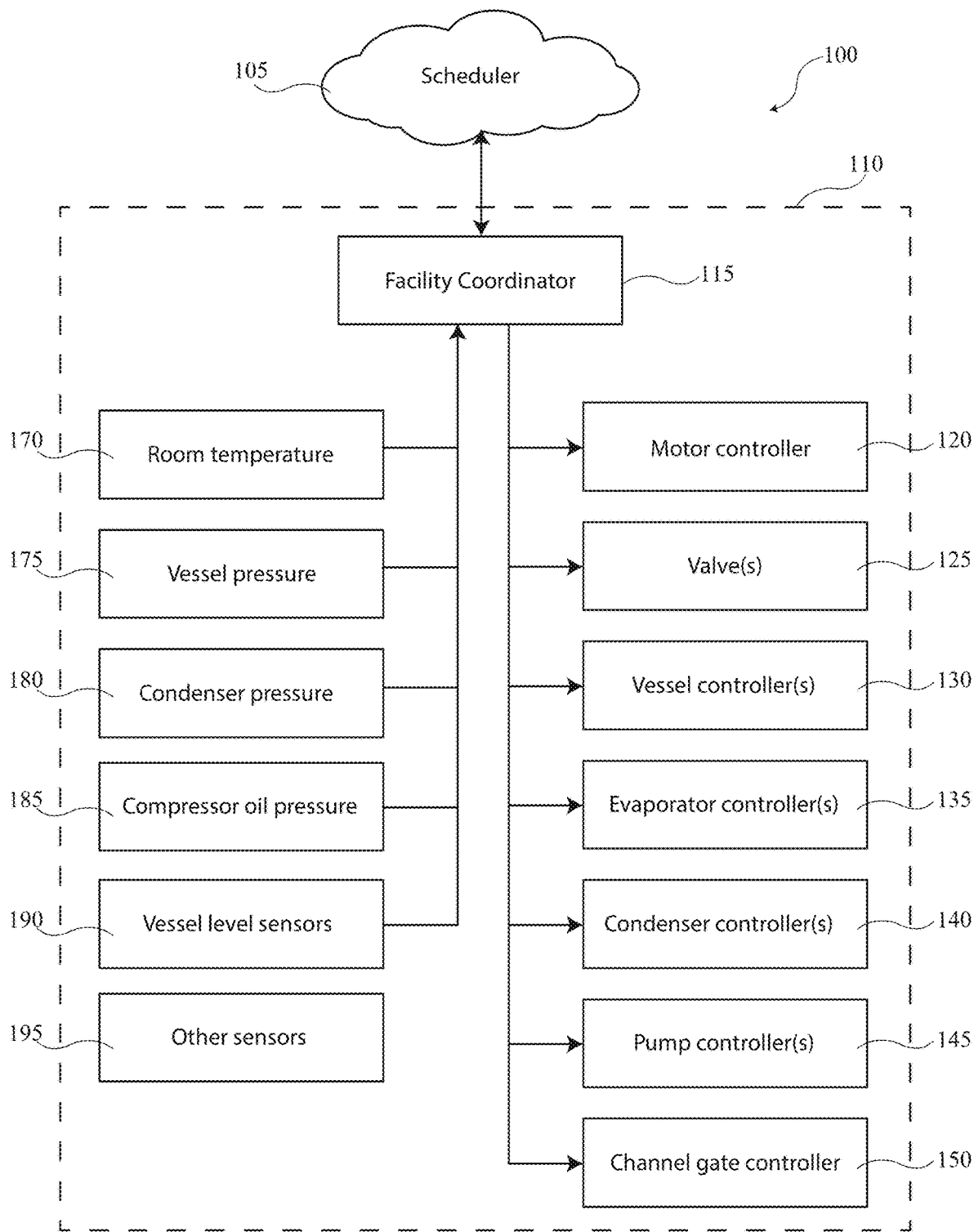
FIG. 1 is a block diagram of an industrial facility control system according to some embodiments.

FIG. 1 is a block diagram of an industrial facility control system 100 according to some embodiments. In some embodiments, the industrial facility control system 100 includes a scheduler 105. The scheduler 105 may be a cloud-based computing system (e.g., Amazon Web Services, Google Cloud, Microsoft Azure, IBM Cloud, etc.) that can use various predictive techniques, which may be based on the state of the facility as determined based on data from various sensors within an industrial facility 110, to control various controllable devices, which may occur through an onsite facility coordinator or may occur directly from the cloud or both. In some embodiments, the scheduler 105 may include various algorithms that can be used to optimize the energy use according to various metrics such as, for example, based upon energy usage within the industrial facility 110.

In some embodiments, the industrial facility control system 100 includes an industrial facility 110 and a scheduler 105. The industrial facility 110 may include any type of facility that may include various subsystems and/or systems. For example, the industrial facility 110 may be a cold storage facility, a factory, a farm, a packing house, a dairy, a grow facility, a hydroponic facility, a warehouse, a distribution center, a cement manufacturing facility, oil and gas processing facilities, water treatment plants, oil refineries, petrochemical processing facilities, chemical processing facilities, natural gas processing facilities, crop irrigation, water districts, desalinization, etc.

In some embodiments, the industrial facility control system 100 may include a facility coordinator 115. The facility coordinator 115 may be in communication with the scheduler 105 via any network connection. In some embodiments, the network connection may be a wired connection such as, for example, via the Internet. In some embodiments, the communication channel between the facility coordinator 115 and the scheduler 105 may be initiated via a request from the facility coordinator 115. In some embodiments, the network connection may be a wireless connection such as, for example, a 4G or 5G network (or similar), an LTE network, a satellite network, etc.

In some embodiments, the industrial facility 110 may include any number of controllable devices such as, for example, motors 120 (e.g., fans, turbines, etc.), valves 125, vessels, evaporators, condensers, pumps, compressors, doors, underfloor heating elements, lighting, defrost equipment, centrifuges, furnaces, etc. In some embodiments, the controllable devices may be controlled by a device controller that interfaces with the facility coordinator 115. For example, a vessel may be controlled by a vessel controller 130; an evaporator may be controlled by an evaporator controller 135; a condenser may be controlled by a condenser controller 140; a pump may be controlled by a pump controller 145, a channel gate controller 150, valves may be controlled by a valve controller, and heaters/heating elements may be controlled by heater/heating element controllers, or an any other controllable device or controller. In some embodiments, these controllers may be coupled with the facility coordinator 115, may be integrated with the controllable device, and/or may or may not be designed by the manufacturer of the controllable device.

In some embodiments, the facility coordinator 115 may be in communication with each of the controllable devices and may provide commands to the various controllable devices.

In some embodiments, the industrial facility 110 may include any number of sensors such as, for example, a temperature sensor 170, a vessel pressure sensor 175, a condenser pressure sensor 180, a compressor oil pressure sensor 185, vessel level sensor 190, a humidity sensor, a fan speed sensor, a voltage sensor, or anemometer, flow meter, microphone, vibration sensor, pH meter, optical density meter, chemical concentration sensors, or any other sensor 195. The sensor may include any type of transducer that can translate physical properties into an electrical signal (either an analog or digital signal) that can be communicated to the facility coordinator 115 via a wired or wireless communication network. In some embodiments, the sensors may include any type of Internet of Things (IoT) device that can measure physical properties and communicate these properties to a network database such as, for example, at the facility coordinator 115.

In some embodiments, an industrial facility 110 may be a cold storage facility that may include any number of buildings. In some embodiments, an industrial facility 110 may include one or more cold storage buildings that use a vapor-compression refrigeration system to cool one or more rooms within the cold storage facility.

Figure 3:
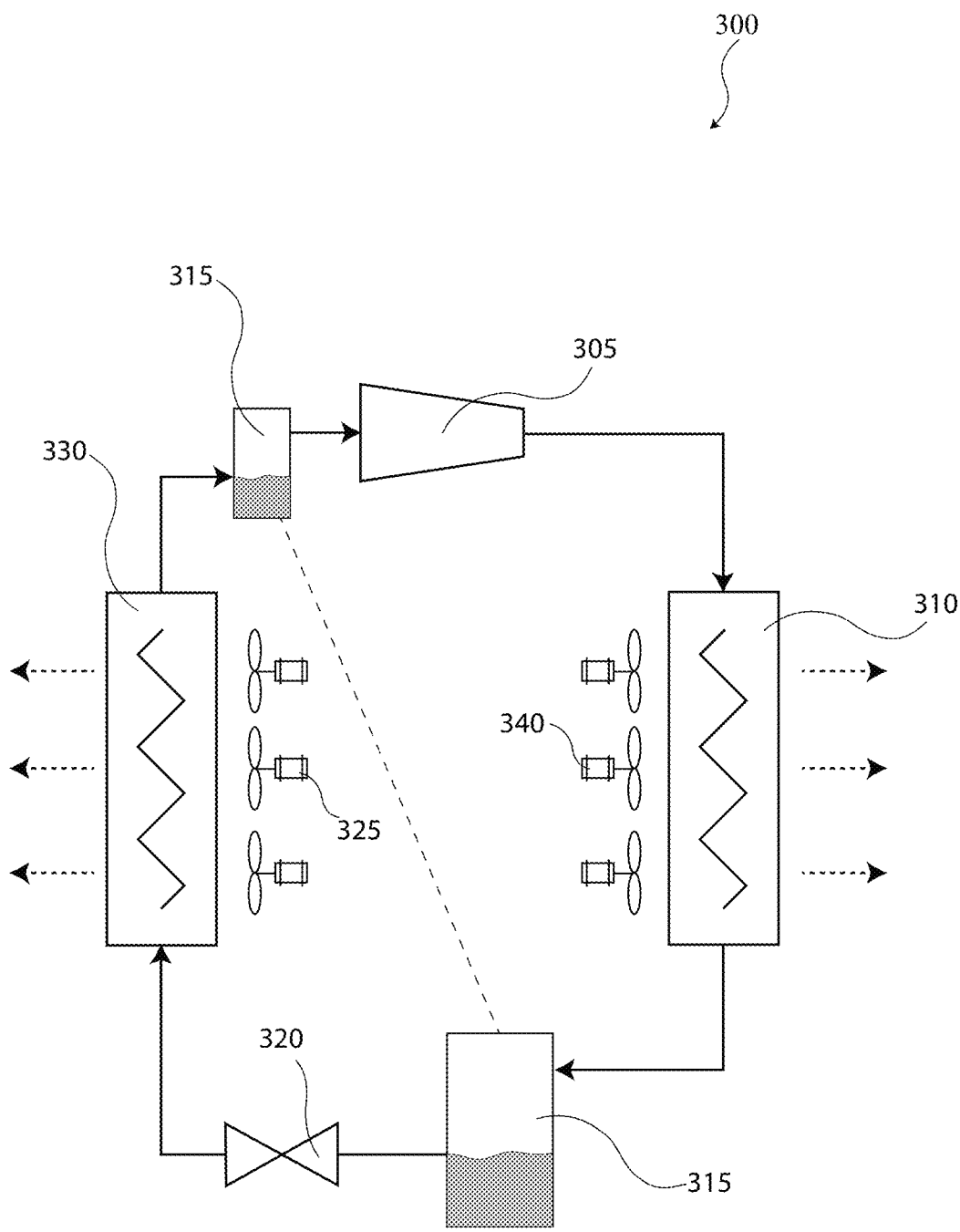
FIG. 3 is a block diagram of a direct expansion single stage vapor-compression refrigeration system according to some embodiments.

A block diagram of an example refrigeration system 300 is shown in FIG. 3. The refrigeration system 300 may include one or more compressors 305, one or more condensers 310, vessel 315 one or more expansion valves 320, one or more evaporators 330, a plurality of evaporator fans 325, and a plurality of condenser fans 340. In some embodiments, the condenser 310 may include the plurality of condenser fans 340. In some embodiments, the evaporate may include the plurality of evaporator fans 325. The vessel 315, while shown graphically as two vessels, may be a single vessel. In some embodiments, the vessel 315 may enclose the refrigerant in both vapor and liquid states. The liquid level within the vessel 315 may be vary based on various parameters.

In some embodiments, a circulating liquid refrigerant can be used in the refrigeration system 300 as the medium which absorbs and removes heat from a space to be cooled within the industrial facility 105 and subsequently rejects that heat elsewhere. The refrigeration system 300 may include a compressor 305, a condenser 310, a thermal expansion valve 320 (e.g., which also may be called a throttle valve or metering valve), an evaporator 330, or a vessel 315. The circulating refrigerant can enter the compressor 305 from the vessel 315 in the thermodynamic state known as a vapor (e.g., saturated vapor or non-saturated vapor) and is compressed to a higher pressure, resulting in a higher temperature as well. The hot, compressed vapor can then be in the thermodynamic state known as a superheated vapor and is at a temperature and pressure at which it can be condensed with either cooling water or cooling air flowing across coils or tubes in the condenser 310. This is where the circulating refrigerant can reject heat from the system. The rejected heat can be carried away by either the water or the air (whichever may be the case). The condenser fans 340, for example, can blow air across the condenser 310, which may warm the air carrying away the heat.

The condensed liquid refrigerant, in the thermodynamic state known as a saturated liquid, can then be returned to and held in vessel 315. The liquid refrigerant may then be routed through an expansion valve 320 where it undergoes an abrupt reduction in pressure. That pressure reduction may result in the adiabatic flash evaporation of a part of the liquid refrigerant. The auto-refrigeration effect of the adiabatic flash evaporation can lower the temperature of the liquid and vapor refrigerant mixture to where it is colder than the temperature of the enclosed space to be refrigerated; this may occur within the evaporator 320.

The cold mixture can be routed through coils or tubes in the evaporator 320. One or more evaporator fans 325 can circulate the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space. The evaporator 320 is where the circulating refrigerant absorbs and removes heat which is subsequently rejected in the condenser 310 and transferred elsewhere by the water or air used in the condenser 310.

To complete the refrigeration cycle, the refrigerant vapor from the evaporator 320 is again a saturated vapor and is routed back into the compressor 305.

In some embodiments, the facility coordinator 115 may receive sensor data from one or more sensors. In some embodiments, the sensor data may be stored at the facility coordinator 115. In some embodiments, the sensor data may be communicated to the scheduler 105 and/or stored in a database in the cloud. In some embodiments, the sensor data may be stored at the facility coordinator 115 and communicated to the scheduler 105 on a predetermined cadence such as, for example, every minute, every few minutes, every 15 minutes, every hour, every day, every week, or every month. In some embodiments, the facility coordinator 115 may also communicate information such as the active prescription, corrective action applied, modifications to a prescription, etc. In some embodiments, the facility coordinator 115 may apply some corrective action based on the sensor data.

To control the facility, in some embodiments, the facility coordinator 115 may receive one or more prescriptions from the scheduler 105. A prescription may include one or more environmental, process, or facility set points to be conducted or achieved by the facility coordinator 115. In some embodiments, the facility coordinator 115 may translate a prescription to achieve a set point based on the specific devices, equipment, environment, controllers, etc. located within the industrial facility 110. In some embodiments, the facility coordinator 115 may receive abstract or broad facility prescriptions and translate these prescriptions into a translated prescription that may, for example, include actionable or specific commands, which may be manifested by changing set points to equipment controllers and/or higher level control systems, individual device actuator signals, etc., and/or some combination thereof, and which can be implemented, applied, or executed within a specific facility. The facility coordinator 115 may translate a prescription from the scheduler 105 into a prescription that is actionable at the specific industrial facility 110 based on the various constraints and equipment at the specific industrial facility 110. In some embodiments, the scheduler 105 may perform some translation of the prescriptions prior to transmission to the facility coordinator 115.

In some embodiments, a prescription may be provided by the scheduler 105 to attempt to optimize energy use within the industrial facility 110. For example, a prescription may include a temperature set point for a specific industrial facility 110 and/or components or portions of the industrial facility 110 such as, for example, one or more rooms or one or more blast cells; a fan speed set point for one or more fans; a vessel pressure set point or a vessel level set point for one or more vessels, a compressor energy usage set point or a compressor speed set point for one or more compressors; a defrost time period or schedule, a duration of defrost sub events within a defrost event, a condenser pressure set point for one or more compressors, an irrigation channel gate position set point, a water pump power set point or a water pump speed set point for one or more water pumps, an irrigation line valve set point for one or more irrigation line valves, a fertilizer feed rate, a flow rate set point for one or water pumps, an industrial agitator motor speed set point for one or more motors, or a turbine speed set point, etc.

Figure 6:
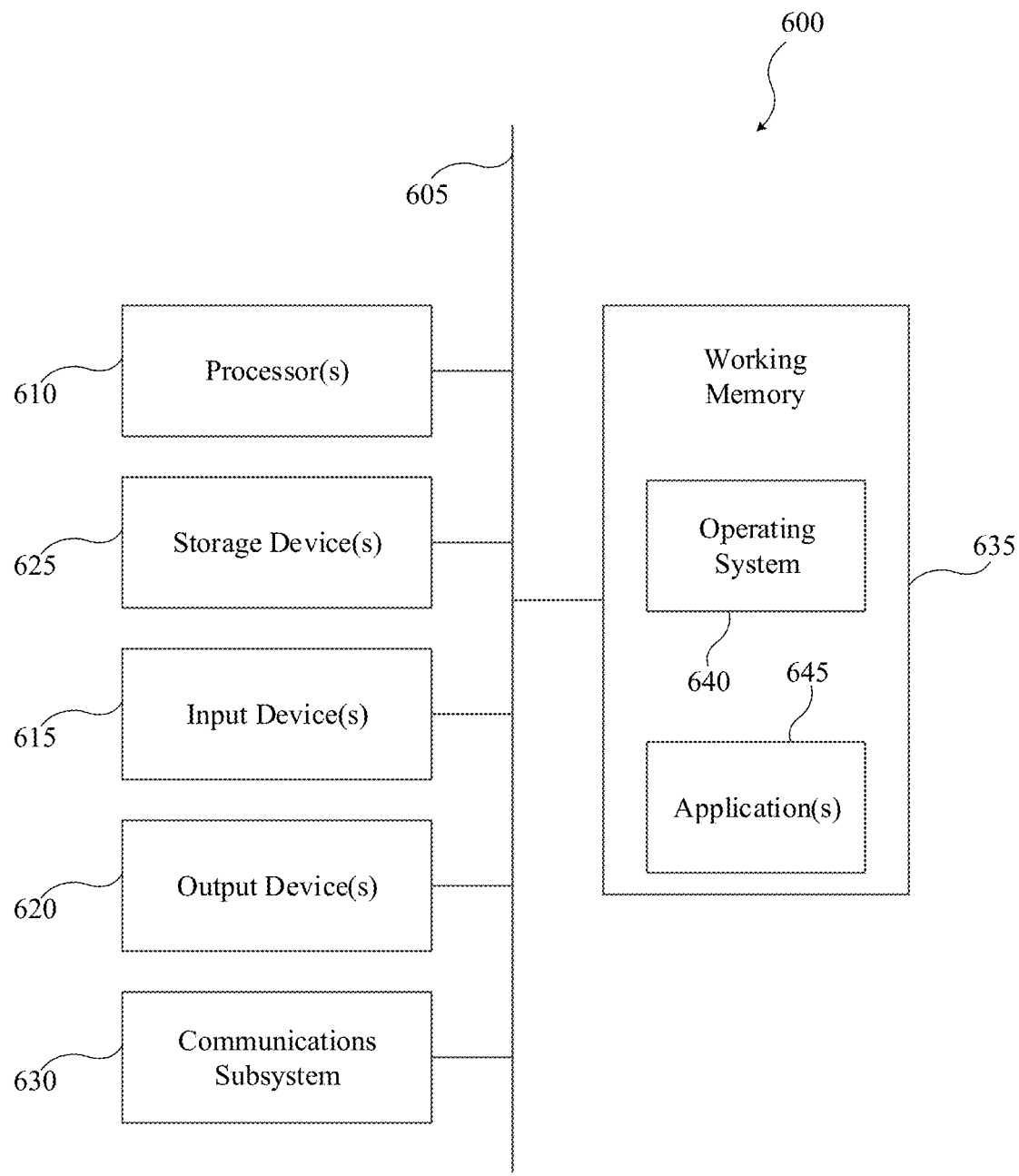
FIG. 6 shows an illustrative computational system for performing functionality to facilitate implementation of embodiments described herein.

In some embodiments, the facility coordinator can include all or a portion of the components of the computational system 600 shown in FIG. 6.

In addition, in some embodiments, the facility coordinator 115 may receive one or more equipment constraints, operational constraints, or environmental constraints (collectively or individually "constraints") from the scheduler 105 or have one or more equipment constraints, operational constraints, or environmental constraints hard coded within the facility coordinator 115. The facility coordinator 115 may receive one or more constraints from the scheduler 105 at a given time and update the constraint at the facility coordinator 115. In some embodiments, constraints may be hard-coded within a given equipment or device, or hard-coded within the facility coordinator 115. In some embodiments, certain hard-coded constraints may not be modifiable remotely.

An equipment constraint, for example, may include a maximum vessel pressure, a minimum vessel pressure, a maximum vessel level, a minimum vessel level, a maximum compressor oil temperature, maximum compressor intake pressure, minimum compressor discharge pressure, minimum running compressor speed, a maximum condenser pressure, a maximum fan speed, a minimum running fan speed, etc. Any of the equipment constraints, for example, may be a function of operational, environmental, and other equipment states.

An environmental constraint, for example, may include a maximum temperature, a minimum temperature, a maximum humidity, a minimum humidity, maximum pressure, minimum pressure, lights on/off, etc. In some embodiments, an environmental constraint may be specific to a facility, a subsection of a facility, or a given room within a facility. In some embodiments, an environmental constraint may depend on a product, a product family, or a product type.

An operational constraint, for example, may include any type of constraint related to operations, or constraints that are not environmental constraints or equipment constraints. An operational constraint, for example, may include a constraint to periodically defrost certain pipes, lower the fan speeds during certain hours, lower or turn off the fans when a door is open or within a time period of being opened, quickly freeze certain items within a certain period of time, lights on time, lights off time, etc. The operational constraints, for example, may include time-based constraints.

In some embodiments, the constraints may be hierarchical. For example, a temperature constraint may override a constraint that limits the time period when fans are running. As another example, a vessel pressure constraint may override a fan speed constraint. As another example, an equipment constraint may override an operational constraint. As another example, an equipment maintenance schedule constraint may take precedent or have priority over a cooling power constraint. Constraints may take a hierarchy of priority, including immutable properties of a piece of equipment (e.g., a fan speed is bound by zero and its max rpm, the level of a vessel is bound by zero and the height of the vessel, etc.), environmental constraints (e.g., room temperature, humidity, etc.), and prescribed constraints (e.g., the scheduler prescribing a fan speed, cooling power, etc.). In all cases, a prescribed constraint has the lowest priority. As an example, a room temperature operational constraint may override an evaporator fan speed prescription/cooling power prescription. An as another example, a vessel pressure safety constraint may override an environmental constraint such as, for example, a room temperature set point. Various other hierarchies may be defined and followed.

Figure 2:
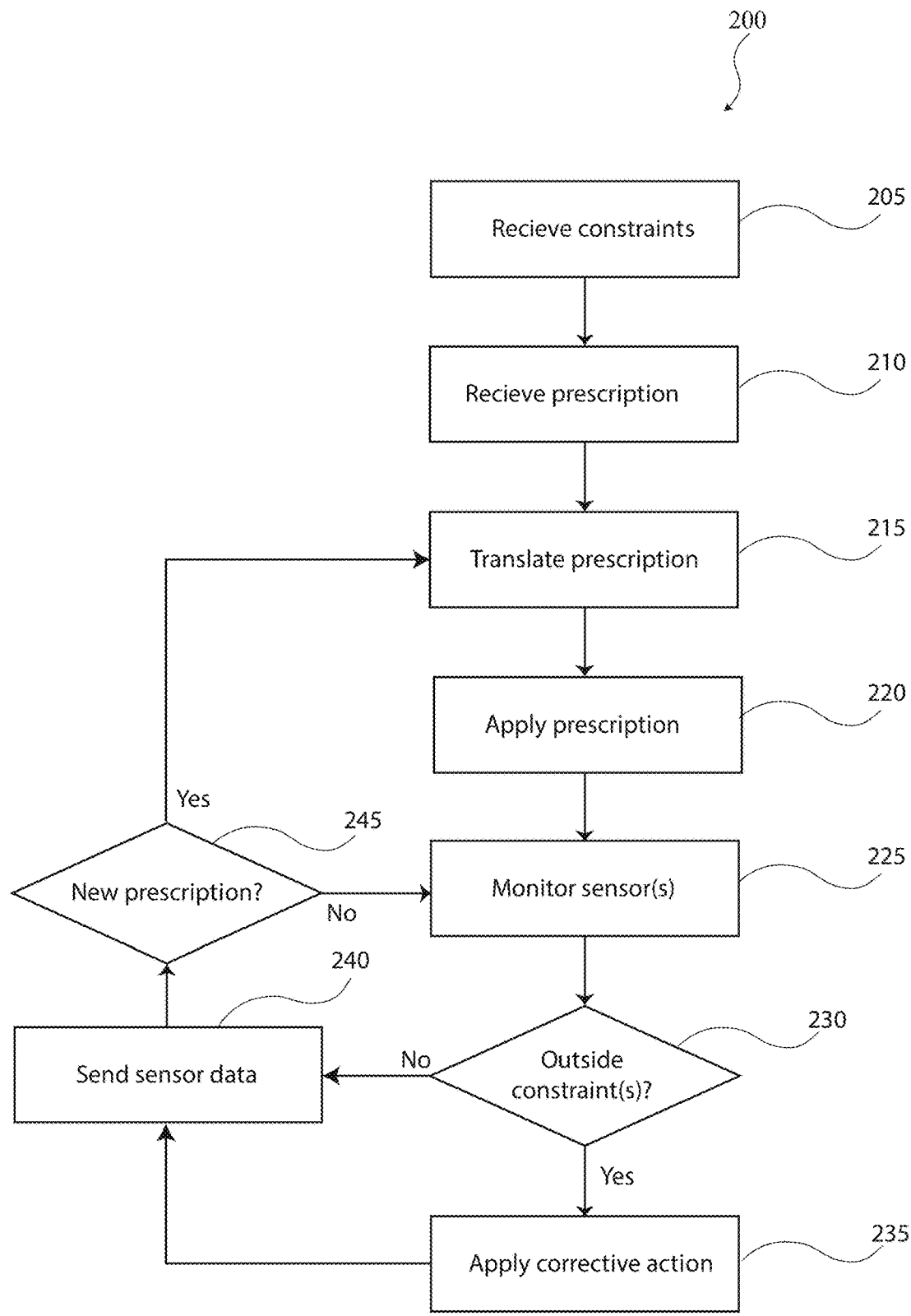
FIG. 2 is a flowchart of a process that can occur at a facility coordinator according to some embodiments.

FIG. 2 is a flowchart of a process 200 that can occur at the facility coordinator 115. The process 200 includes a number of blocks. Any number of additional blocks may be used. In addition, any of the blocks included in the process 200 may be eliminated or rearranged or replaced.

Constraints are received at the facility coordinator 115 at block 205. These constraints may be received, for example, from the scheduler 105. As another example, the constraints may be manually input by an on-site technician or may be the default system constraints. The constraints, for example, can be tailored to a specific environment at an industrial facility 110, tailored to specific devices used at the industrial facility 110, tailored to specific processes used at the industrial facility 110, or tailored to specific uses or operations at the industrial facility 110. In some embodiments, the constraints can be fixed over long periods of time (months) or short periods of time (days).

At block 210 one or more prescriptions may be received from the scheduler 105. A prescription, for example, may be a plurality of set points or equipment commands that may or may not have an associated time component and can be interpreted by the facility coordinator 115 and used by the facility coordinator to control specific equipment within the industrial facility 110. In some embodiments, prescriptions may be periodically transmitted from the scheduler 105 to facility coordinator 115 such as, for example, every 15, 30, 60, or 90 minutes, etc.

At block 215 the prescription may be translated. For example, a prescription may be received in a given format yet the controllable device(s) or controller(s) may require input in a different format. The facility coordinator 115 may translate the prescription into a format that can be used to control the controllable device(s) or controller(s). As another example, a prescription may be an environmental prescription (e.g., turn the temperature to −5° C.). The facility coordinator may translate the environmental prescription into commands that can be sent to controllable device(s) and/or controller(s) to achieve the environmental prescription.

As another example, translation may include modifying the setting on different equipment. For example, a prescription to increase or decrease the temperature within a cold storage facility may require commands to increase or decrease fan speed and/or open or close one or more valves coupled with vessels, compressors, pumps, and/or evaporators. In some embodiments, a prescription to increase or decrease the fan speed within the cold storage facility may trigger the facility coordinator to issue commands to open and close one or more valves coupled with vessels, compressors, pumps, and/or evaporators (e.g., translate a prescription at block 215).

In some embodiments, a prescription may include a time limit. For example, the prescription may state that the temperature should be brought below a specific temperature for a specific period of time. The facility coordinator 115 may continue with the prescription until the time limit has expired or until a new prescription has been sent.

At block 220 the prescription may be applied. For example, commands can be sent to the controllable device(s) and/or the controller(s) to carry out (or execute) the prescription.

At block 225 various sensors may be monitored. For example, sensors may be monitored to determine the status of the environment in response to execution of the prescription. As another example, the sensors may be monitored to determine whether an environment is approaching or has reached one or more constraints.

At block 230 the facility coordinator 115 can determine whether the sensor data indicates that the industrial facility 110 is operating outside of one or more constraints or will soon be operating outside of one or more constraints. For example, sensor data may be compared with the one or more constraints received at block 205. As another example, sensor data may be averaged over a period of time and then compared with one or more constraints. At block 230 real-time sensor data may be used to determine whether one or more constraints are being violated or about to be violated.

If the industrial facility 110 is operating within all the constraints, then process 200 proceeds to block 240.

If the industrial facility 110 is operating outside one or more constraints, then process 200 proceeds to block 235. At block 235 corrective action can be taken by the facility coordinator 115. Corrective action may include making operational changes to one or more controllable devices. For example, fan speeds can be increased or decreased; vessel pressure may be decrease by opening one or more valves; etc.

Figure 7:
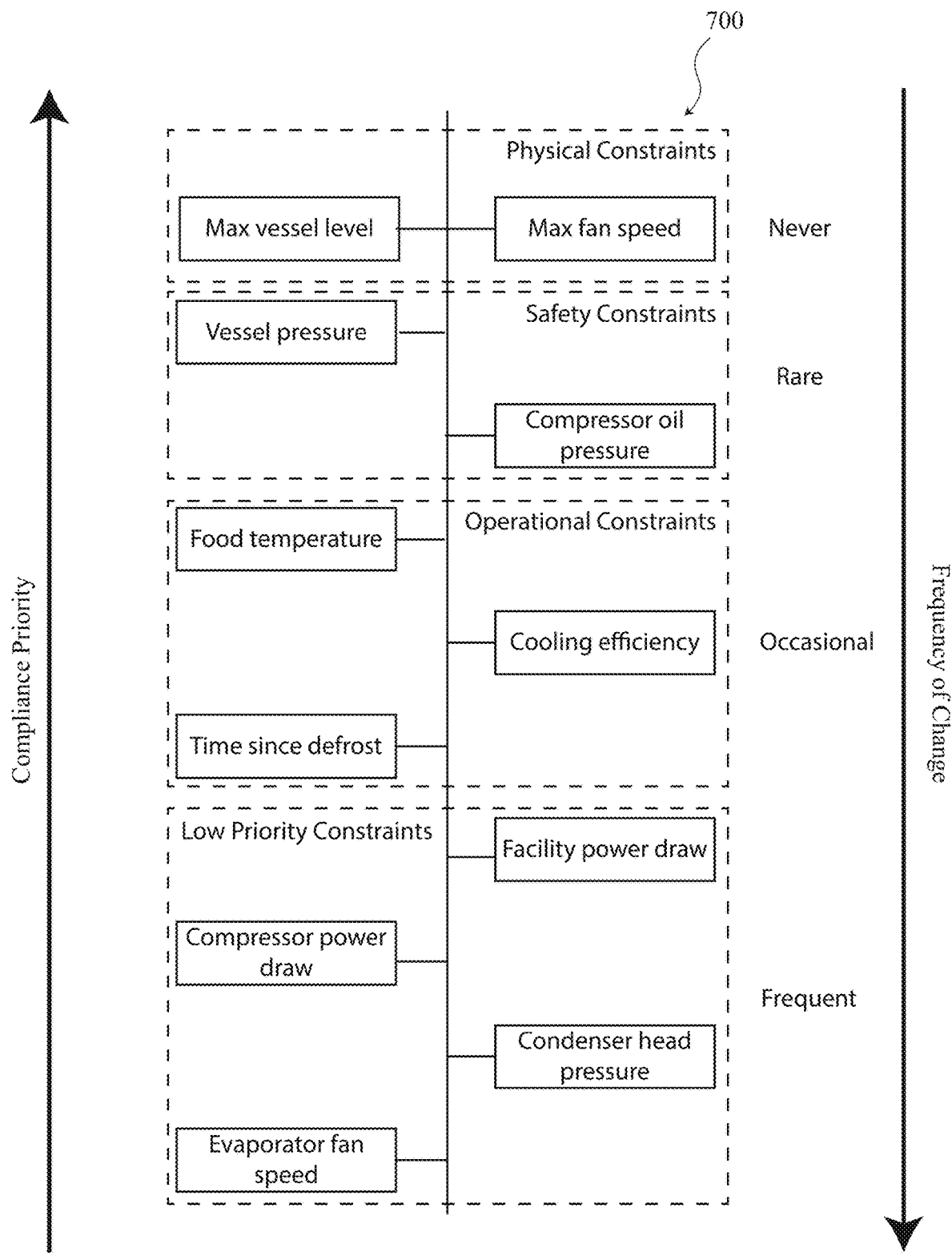
FIG. 7 is a block diagram of a constraint hierarchy according to some embodiments.

In some embodiments, the corrective action may include a hierarchy of steps (e.g., a constraint hierarchy as shown in FIG. 7). For example, if the temperature within a cooler is above a constraint, then the fans speed may be increased. If this does not bring the cooler into compliance within the constraints, then pressure in the vessel may be decreased or the flux of liquid refrigerant in the evaporator may be increased. The corrective action may be facility dependent and/or constraint dependent.

In some embodiments, a constraint hierarchy may progress from constraints that are rarely (or never) changed or adjusted to constraints that may be frequently or regularly changed or adjusted. An example constraint hierarchy is shown in FIG. 7.

After block 235, process 200 proceeds to block 240. At block 240 sensor data can be transmitted from the facility coordinator 115 to the scheduler 105. In some embodiments, other data may be transmitted to the scheduler 105 such as, for example, translated prescriptions, constraints being violated, corrective action, etc.

After block 240, the process 200 proceeds to block 245. In some embodiments, blocks 240 and 245 may operate independently from one another or in parallel. For example. In some embodiments, sensor data can be sent to the scheduler 105 independent of any prescription or receiving a new prescription at block 245. In some embodiments, block 240 may be skipped altogether or performed independent of process 200.

At block 245, it can be determined whether a new prescription has been received at the facility coordinator 115 from the scheduler 105. If a new prescription has been received, then process 200 proceeds to block 215. If a new prescription has not been received then process 200 proceeds to block 225. In some embodiments, if the prescription has expired, then process 200 may maintain the values, set points, equipment states, or instructions in the prescription until a new prescription has been received or until one or more constraints have been reached. Alternatively or addition, if the prescription has expired, a default prescription may be followed.

In some embodiments, if a constraint has been violated, then process 200 may proceed to a default prescription state, which may have static process set points, equipment states, or a previous state until a new prescription has been received. The default prescription state may include a plurality of device setpoints that should be maintained in the absence of an active prescription or when a prescription has expired.

The process 200 can be implemented in a number of different ways. The following is one specific example of an implementation of process 200 where the industrial facility 110 is a cold storage facility. In this example, the cold storage facility may include one or more of the various controllable devices shown in FIG. 3 such that fans are configured and disposed to blow cold air past an evaporator into a temperature-controlled room. The cold storage facility may also include a room thermometer, a vessel pressure sensor, a compressor pressure sensor, and/or a compressor oil temperature sensor.

At block 205 the cold storage facility constraints are received. In this example, the constraint includes a maximum cooler temperature of 0° F.

At block 210 a prescription is received. In this example, the prescription includes slowing the fans to 50% speed. This prescription may be provided, for example, to ensure that energy use within the facility is optimized over a period of time.

At block 215, the facility coordinator 115 can translate the prescription into a command that is understood by the fans (or the fan controller). For example, the prescription can be delivered to the facility coordinator 115 via a first communication protocol, such as, for example, an text command, and the fan controller can be controlled using a second communication protocol, for example, a Modbus protocol. The facility coordinator 115 can prepare a communication to the fan controller using the second communication protocol.

At block 220, the prescription is applied by sending the commands to the fans via the second communication protocol and/or possibly via fan controllers to decrease the fan speed to about 50%.

At block 225, the temperature in the cooler can be monitored by recording temperature data from a cooler thermometer. In some embodiments, the temperature can be recorded by a thermometer and communicated to the facility coordinator (e.g., via a controller) using a third communication protocol, which may be the same as one of the communication protocols used to communicate between the facility coordinator and the controllable devices.

At block 230, if the temperature in the cooler is below –2° F. (the environmental constraint) then process 200 proceeds to block 240.

At block 230, if the temperature in the cooler is at or above –2° F. (the environmental constraint) then process 200 proceeds to block 235 and corrective action is taken by the facility coordinator. For example, the fan speed can be increased. In some embodiments, the corrective action can include commanding the fan controller to increase the fan speed via the second communication protocol. In some embodiments, the corrective action may also include increasing or decreasing vessel pressure. In some embodiments, the corrective action may include opening or closing one or more valves.

In some embodiments, the temperature in the cooler can be monitored and corrective action can be taken prior to the environment reaching the environmental constraint. For instance, if the trajectory of the sensor data, in this example, temperature over time, is heading toward the environmental constraint, the fans can be turned up slightly in order to avoid reaching the constraint or in an attempt to reach a steady state that is near the constraint as well as close to the prescription.

At block 240 the sensor data can be sent to the facility scheduler. And at block 245, if a new prescription has not been sent, then process 200 proceeds to block 225 and blocks 225, 230, 235, and 240 are repeated until a new prescription is received. If a new prescription has been received, then process 200 proceeds to block 215.

Another example of constraint for a cold storage facility may include a temperature range such as, for example, between –F° C. and –10° F. Various other constraints may be used within a cold storage facility; and various other sensors may also be monitored to ensure the cold storage facility is operating within the constraints.

The following is another specific example of an implementation of process 200 where the industrial facility 110 is a cold storage facility. In this example, the cold storage facility may include the various controllable devices shown in FIG. 3 such that fans are configured and disposed to blow cold air past the evaporator into the cooler. The cold storage facility may also include a cooler thermometer, a vessel pressure sensor, a compressor intake pressure sensor, a compressor discharge pressure sensor, and/or a compressor oil temperature sensor.

At block 205 the cold storage facility constraints are received. In this example, the constraint includes a vessel pressure that must remain below about 40 PSiA.

At block 210 a prescription is received. In this example, the prescription specifies decreasing the cooler temperature to 0° F.

At block 215, the facility coordinator 115 translates the prescription into a command that is understood by the fans (or the fan controller). For example, the prescription can be delivered to the facility coordinator 115 via a first communication protocol. The facility coordinator 115 can create commands to be sent to any or all of the fans (or fan controllers), the valves 125, vessel controllers 130, evaporator controller 135, condenser controller 140, and/or the pump controller 145. For example, a command can be created for the fan controller to increase the fan speed, a command can be prepared for the pump controller 145 to increase the vessel pressure, and/or a command can be prepared for the valve controller(s) to open or close one or more valves. Each of these commands can be created in a protocol that is readable and followable by the various controllable devices.

At block 220, the prescription is applied by sending the commands to the various controllable devices using the requisite communication protocols for each controllable device.

At block 225, the pressure within the vessel is monitored by recording pressure data from a pressure sensor. In some embodiments, the pressure value can be recorded by a pressure sensor and communicated to the facility coordinator (e.g., via a controller) using a fourth communication protocol, which may or may not be the same as any other communication protocol.

At block 230, if the pressure within the vessel is below 40 PSIA (the constraint) then process 200 proceeds to block 240.

At block 230, if the pressure within the vessel is above 40 PSIA then process 200 proceeds to block 235 and corrective action is taken by the facility coordinator. For example, a valve can be opened to alleviate pressure within the vessel. As another example, fan speeds can be increased to remove more heat from the system lowering the vessel pressure.

In some embodiments, the pressure in the vessel can be monitored and corrective action can be taken when the pressure is close to the constraint. For instance, if the trajectory of the sensor data, in this example, pressure over time, is heading toward the constraint, the valve can be opened slightly or slowly in order to avoid reaching the constraint or in an attempt to reach a steady state that is near the constraint as well as close to the prescription.

At block 240 the sensor data can be sent to the facility scheduler. And at block 245, if a new prescription has not been sent, then process 200 proceeds to block 225 and blocks 225, 230, 235, and 240 are repeated until a new prescription is received. If a new prescription has been received, then process 200 proceeds to block 215.

Various other examples of process 200 may be considered.

In some embodiments, a facility coordinator 115 or a scheduler 105 may provide rapid prototyping and real-time data analysis via cloud access to all sensor or process data. In some embodiments, custom user privilege levels can be set at the application level to ensure safe and secure cloud access. In some embodiments, secure buffering protocols may be used to ensure synchronization between the facility coordinator and the scheduler 105.

In some embodiments, a facility coordinator 115 or a scheduler 105 may implement hierarchical set-points, set-point inequalities, or set-point ranges to safely control individual components, controllable devices, or sensors. For example, an energy strategy may request a specific speed for an evaporator fan, but the control system must override this request if freezer temperatures reach a user-defined limit.

In some embodiments, virtual sensors may be used. In some embodiments, a user can define the composition of multiple physical sensors or external data to create a virtual sensor. A virtual sensor, for example, can be used in any scenario in which a physical sensor can be used, such as triggering alerts or controlling system processes. For example, suction pressure, discharge pressure and compressor power may be transformed (e.g., using a mathematical transformation) to create a virtual sensor that represents the thermal power and efficiency of the compressor. In some embodiments, the cooling efficiency may include the thermal work (e.g., heat absorbed by the evaporators) relative to electrical work over a period of time. Another virtual sensor, for example, may describe the cooling power (e.g., the heat removed) provided by a given evaporator or set of evaporators via a mathematical transformation based on a model that is a function of evaporator fan speed, air temperature, evaporator coil temperature, coolant flow rate through the evaporator, relevant equipment properties, or coolant properties, or other relevant physical properties. An alert, for example, can be created to notify operations when compressors are underperforming and need maintenance.

In some embodiments, multi-input and/or multi-output process control can be implemented at the facility coordinator. For example, a user can define a custom control process which combines multiple sensors (e.g., including virtual sensors) to control multiple outputs via user defined control methods such as PIDs and deadbands. For example, a custom control process can set facility electrical load by combining sensors throughout the plant and dynamically adjusting multiple components of the refrigeration system simultaneously.

Figure 4:
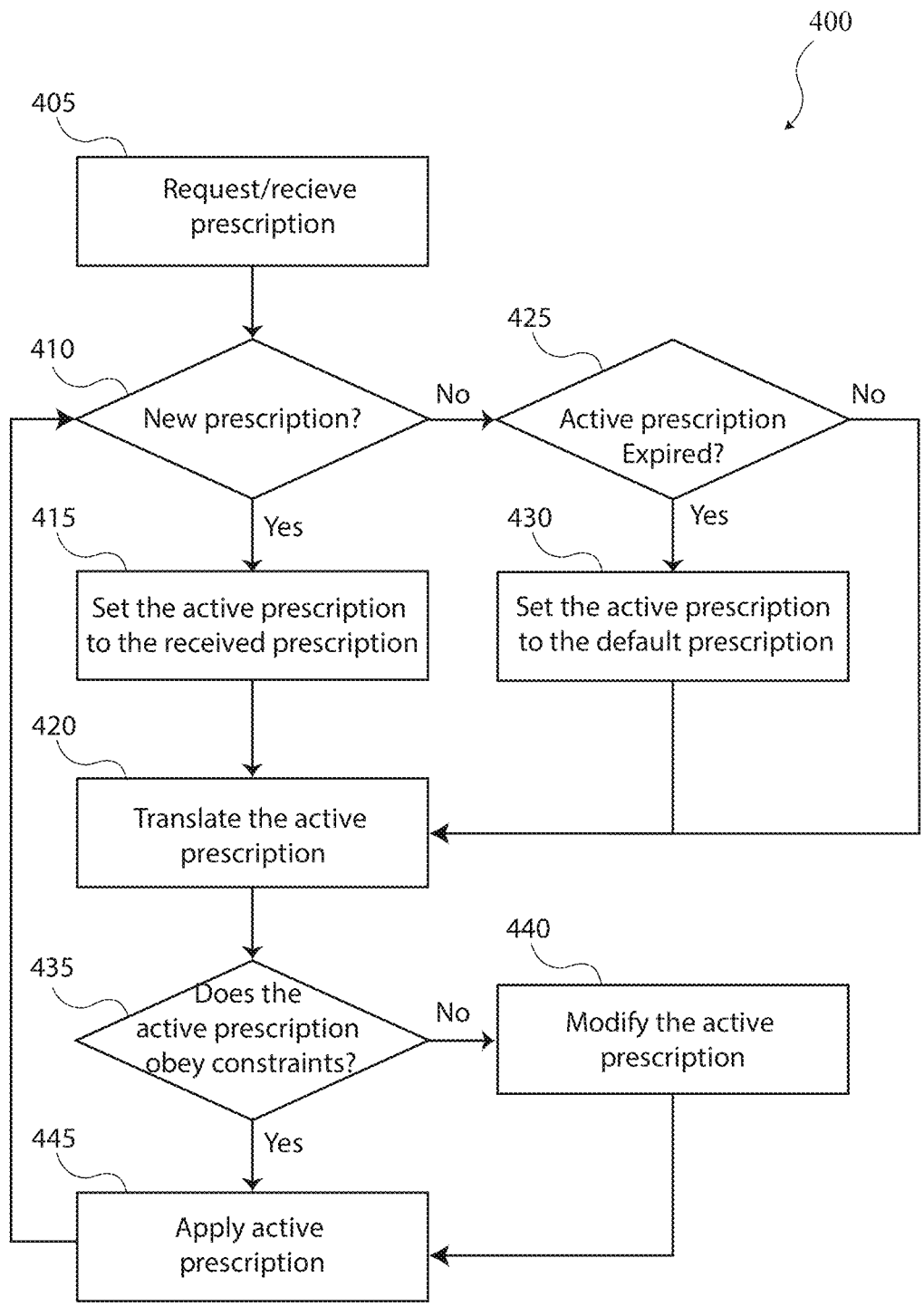
FIG. 4 is a flowchart of a process that can occur at a facility coordinator according to some embodiments.

FIG. 4 is a flowchart of another process 400 that can occur at a facility coordinator 115 according to some embodiments. The process 400 includes a number of blocks. Any number of additional blocks may be used. In addition, any of the blocks included in the process 400 may be eliminated or rearranged or replaced.

The process 400 begins at block 405 where a prescription is received or requested or both. In some embodiments, a prescription may only be received after it has been requested. In some embodiments, various tokens, encryptions, etc. may be used to request and receive a valid prescription.

At block 410 it can be determined if the received prescription is a new prescription. For example, the prescription may be compared with the active prescription to determine whether the prescription is new. If the received prescription is new, then the process 400 proceeds to block 415 and the received prescription is set to the active prescription.

If the received prescription is not new at block 410, then the process 400 proceeds to block 425. At block 425 it can be determined whether the active prescription has expired. A prescription, for example, may have a time limit and the prescription may be expired if the time limit has been reached. As another example, prescriptions without a time limit may be active for a default time limit. If the default time limit has been reached, then the prescription may be expired. If the prescription has not expired, then the process 400 proceeds to block 420.

If the prescription has expired, then the process 400 proceeds to block 430 where the default prescription may be set to the active prescription. The default prescription may include a previously set prescription that may be applied when received prescriptions have expired or in the absence of any received prescriptions. The default prescription may be updated from time to time by the scheduler.

At block 420, the active prescription may be translated. In some embodiments, the active prescription may be translated into set points or equipment states specific to the industrial facility 110. For example, the active prescription may indicate a temperature set point of 0° F. for a refrigerated room at the industrial facility 110. The active prescription may be translated into a translated prescription that specifies the cooler setpoint of 0° F., an evaporator equipment state (for example, the state of evaporator fans, vessels, or valves), or a condenser equipment state (for example, the state of evaporator fans, vessels, or valves).

As another example, translation may include modifying the setting on different equipment. For example, a prescription to increase or decrease the temperature within a cold storage facility may require commands to increase or decrease fan speed and/or open or close one or more valves coupled with vessels, compressors, pumps, and/or evaporators. In some embodiments, a prescription to increase or decrease the fan speed within the cold storage facility may trigger the facility coordinator to issue commands to open and close one or more valves coupled with vessels, compressors, pumps, and/or evaporators (e.g., translate a prescription at block 420).

In some embodiments, a prescription may include a time limit. For example, the prescription may state that the temperature should be brought below a specific temperature for a specific period of time. The facility coordinator 115 may continue with the prescription until the time limit has expired or until a new prescription has been sent.

In some embodiments, at block 420 the active prescription may or may not be translated.

At block 435 it can be determined whether the active prescription obeys or violates any constraints. In some embodiments, violating a constraint may include a prediction or a high probability that the prescription would violate a constraint if applied for the specified time period, if any. If the active prescription does not violate any constraints then the process 400 proceeds to block 445 and active prescription is applied. If the active prescription violates any constraints, then the process 400 can proceed to block 440 and the prescription may be modified prior to having the active prescription applied at block 445. After applying the active prescription, the process 400 proceeds to block 410 and the process 400 repeats. In some embodiments, a new prescription may be received while the active prescription is being applied.

In some embodiments, multiple prescriptions may be applied at the same time. For example, a first prescription may require the temperature within a cooler to be kept under a temperature set point for example for operational or efficiency purposes. A second prescription may require the fan speed of the evaporator fans 325 or the condenser fans 340 to be kept below a 80% of maximum fan speed for electrical efficiency purposes. As another example, a first prescription may dictate a time-varying vessel pressure, while a second prescription may dictate a time-varying fan speed. As another example, a first prescription may dictate a time-varying facility power draw, while a second prescription may dictate a set of time-varying cooling powers.

In some embodiments, two or more prescriptions may be applied during the same time period. In some embodiments, either or both the first prescription and the second prescription may have a priority identifier that indicates the priority that one prescription and any corresponding constraints have a higher priority over another prescription at any corresponding constraints. For example, the first prescription may have a higher priority indicator than the second prescription indicating that the second prescription may be violated in order to accomplish the first. The facility coordinator can attempt to apply or accomplish both prescriptions without violating either but may violate the second if needed to accomplish the first. For example, a corrective action may include increasing the evaporator fans 325 or the condenser fans 340 to a speed above the speed indicated in the second prescription.

At block 435, the active prescription can be compared with the facility constraints. In some embodiments, the active prescription may be compared with a hierarchy of constraints such as, for example, the hierarchy of constraints shown and discussed in conjunction with FIG. 7. The active prescription, for example, can be compared against any physical constraint. For example, the active prescription may be compared against various constraints based on the priority of the constraint. For example, if the active prescription will violate a physical constraint or have a sufficient probability of violating a physical constraint, then the active prescription will be modified at block 440 to ensure that the physical constraint is not or has a lower probability of being violated. For example, one or more set points prescribed by the prescription may be adjusted to ensure that the physical constraints will not be violated or will have a lower probability of being violated.

As another example, if the active prescription will violate a safety constraint or has a sufficient probability of violating a safety constraint, then the active prescription will be modified at block 440 to ensure that the safety constraint is not or has a lower probability of being violated. For example, one or more set points prescribed by the prescription may be adjusted to ensure that the safety constraints will not be violated or will have a lower probability of being violated. In some embodiments, in rare circumstances a safety constraint may be allowed to be violated for short periods of time. In some embodiments, a safety constraint may be allowed to be violated to ensure that a physical constraint is not violated.

As another example, if the active prescription will violate an operational constraint or have a sufficient probability of violating an operational constraint, then the active prescription will be modified at block 440 to ensure that the operational constraint is not or has a lower probability of being violated. For example, one or more set points prescribed by the prescription may be adjusted to ensure that the operational constraints will not be violated or will have a lower probability of being violated. In some embodiments, an operational constraint may occasionally be allowed to be violated for short periods of time. In some embodiments, an operational constraint may be allowed to be violated to ensure that either or both a safety constraint or a physical constraint is not violated.

As another example, if the active prescription will violate a low priority constraint or have a sufficient probability of violating a low priority constraint, then the active prescription will be modified at block 440 to ensure that the low priority constraint is not or has a lower probability of being violated. For example, one or more set points prescribed by the prescription may be adjusted to ensure that the low priority constraints will not be violated or will have a lower probability of being violated. In some embodiments, a low priority constraint may occasionally be allowed to be violated for short periods of time. In some embodiments, a low priority constraint may be allowed to be violated to ensure that either or both a safety constraint or a physical constraint is not violated.

For example, if the active prescription requires quickly cooling a specific room at the industrial facility 110 to a temperature below −10° F. in 10 minutes, this prescription may be translated by the facility coordinator 115 to decrease the pressure within vessel 315 to 150 torr, increase the speed of evaporator fans 325 to 1300 rpm, and increase the speed of the condenser fans 340 to 1100 rpm in order to meet the prescribed set point within 10 minutes. The system, however, may have the following constraints: the minimum vessel pressure must be above 250 torr; the max evaporator fan speed must be below 1200 rpm, the cooling efficiency must be greater than 1.5, and the facility power draw must be below 500 KW.

At block 435, it can be determined that decreasing the pressure within vessel 315 to 150 torr will violate the physical constraint of keeping the pressure vessel above 250 torr. At block 440, the active prescription may be modified to keep the pressure vessel above 250 torr such as, for example, at 300 torr, At block 435, it can also be determined that increasing the speed of the evaporator fans 325 to 1300 rpm will violate the physical constraint of keeping the evaporator fan speed below 1200 rpm. At block 440, the active prescription may be modified to keep the evaporator fan speed below 1200 rpm such as, for example, at 1150 rpm.

At block 435, it can also be determined that the combination of the fan speed at 1150 rpm and the vessel pressure at 300 torr will result in a cooling efficiency less than 1.5. However, since the active prescription lasts 10 minutes, the cooling efficiency may be allowed to be above 1.5 for 10 minutes. As such, at block 440 no modification may be made to the active prescription to accommodate for the cooling efficiency. In some embodiments, the cooling efficiency may be allowed to go below the cooling efficiency constraint during non-peak power consumption time periods such as, for example, during nighttime. As another example, at block 440 the fan speed of the condenser fans 340 may be slowed to temporarily increase the cooling efficiency while allowing the evaporator fans 325 to operate at 95% 1200 rpm. As another example, at block 440 the fan speed of the evaporator may be increased, or the pressure in the vessel may be lowered, or a combination of the two, if the room temperature reaches, or is about to reach, an upper limit.

At block 435, it can also be determined that the combination of the fan speed and the vessel pressure will result in a facility power draw greater than 500 kW. However, since the active prescription lasts 10 minutes, the facility power draw may be allowed to be above 500 kW for 10 minutes. As such, at block 440 no modification may be made for the active prescription to accommodate for the power draw. In some embodiments, the power draw may be allowed to go beyond the power draw constraint during periods when electricity prices are low such as, for example, during nighttime.

As another example, an active prescription may require lowering the power draw of the industrial facility 110 by about 200 kW for an hour. At block 420 this active prescription may be translated by the facility coordinator 115 to a number of specific set points or equipment states such as: decrease the power draw of the compressor 305 from 300 kW to 125 kW, decrease the speed of evaporator fans 325 to about 1000 rpm, or decrease the speed of the condenser fans 340 to 750 rpm. The facility coordinator 115 may include a hierarchy of constraints (e.g., see FIG. 7) that are specific to the industrial facility 110 such as, for example, based on the various controllable devices or environment of the facility. The following physical constraints, for example, may be associated with a given industrial facility 110 and monitored by the facility coordinator 115: vessel pressure of vessel 315 must be below about 5000 torr, the speed of the compressor 305 must be below about 5000 rpm, the speed of the evaporator fans 325 must be below about 1300 rpm, the speed of the condenser fans 340 must be below about 1250 or the discharge pressure in the compressor 305 must be below about 12500 torr. The following safety constraints, for example, may be associated with a given industrial facility 110 and monitored by the facility coordinator 115: vessel pressure of vessel 315 must be below about 3000 torr, the vessel level of the vessel 315 must be above about 15% of the maximum vessel level, or the discharge pressure in the compressor 305 must be below about 11,000 torr. The following operational constraints, for example, may be associated with a given industrial facility 110 and monitored by the facility coordinator 115: vessel pressure of vessel 315 must be below about 2000 torr, the temperature within a temperature-controlled room must be below about 0° F., if the evaporator 330 is on, the fan speed of the fans in the evaporator 330 must be above about 350 rpm, if the compressor 305 is on, the speed of the compressor 305 must be above about 500 rpm or the discharge pressure in the compressor 305 must be below about 6500 torr.

At block 435, it can be determined that decreasing the power of the compressor to 125 kW will result in the vessel 315 raising above the 3000 torr vessel pressure safety constraint within 30 minutes. However, increasing the power draw of the compressor 305 to compensate for this while simultaneously decreasing the fan speed of condenser fans 340 fan speed may result in the discharge pressure at 305 going above the discharge pressure operational constraint of 6500 torr. This may subsequently cause the cause the vessel pressure to break its safety constraint of 3000 torr. Therefore, at block 440 it may be determined the prescription may be modified by setting the power draw of the compressor 305 to 200 kW or the condenser's fan speed to 1000 rpm in order to satisfy the high priority safety constraints. To meet the low priority power constraint of 200 kW, the evaporators may only receive 20 kW.

At block 435, for example, it can also be determined that supplying only 20 kW to the evaporator fans will result in an evaporator fan speed of 150 rpm, thus violating the operational constraint of keeping the non-zero evaporator fan speed above 350 rpm. The prescription may be modified at block 440 to supply the prescribed power in order to satisfy the operational evaporator fan speed constraint of 350 rpm, resulting in the lower priority power constraint being violated.

At block 435, it can also be determined that with no cooling (e.g., evaporators off), the room temperature will remain under the operational constraint of 0° F. for 45 minutes. Consequently, the prescription may be modified at block 440 to turn off the evaporators and supply more power to the compressor and/or condenser for the first 30 minutes of the hour while satisfying all constraints and increasing the liquid level in the vessel. For the remaining 30 minutes, the prescription may be modified at 440 to supply more power to the evaporator while decreasing the power to the compressor and condenser fans.

At block 440 (or at block 420), an active prescription may be converted into commands that can be executed by the specific controllable devices at the industrial facility 110. For example, a prescription may be received in a given format yet the controllable device(s) or controller(s) may require input in a different format. The facility coordinator 115 may convert (or translate) the active prescription into a format that can be used to control the controllable device(s) or controller(s). As another example, a prescription may be an environmental prescription (e.g., turn the temperature to −5° F.). The facility coordinator may translate the environmental prescription into commands that can be sent to controllable device(s) and/or controller(s) to achieve the environmental prescription.

Figure 5:
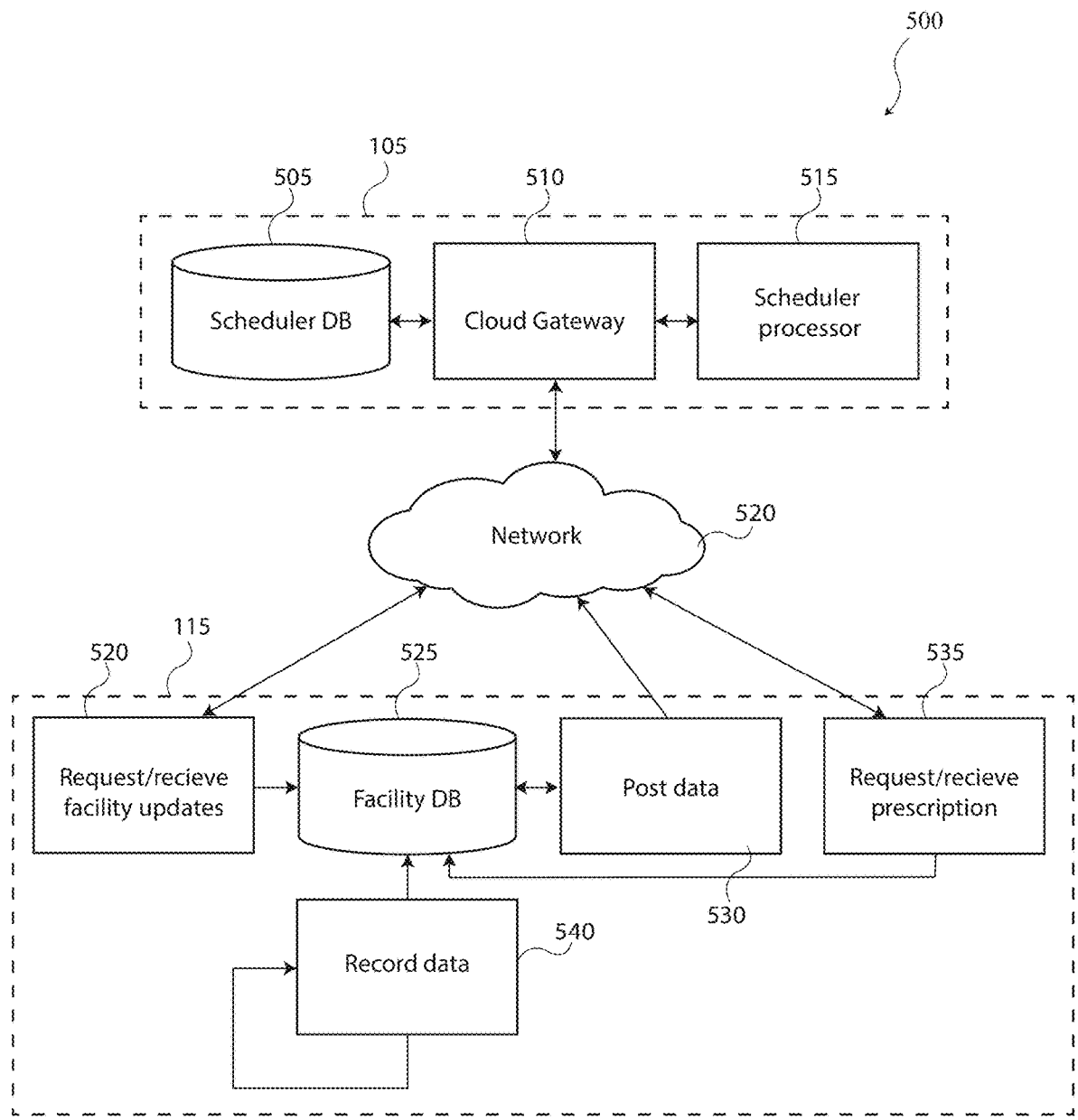
FIG. 5 is a block diagram showing communication pathways between a scheduler and a facility coordinator according to some embodiments.

FIG. 5 is a block diagram 500 showing communication pathways between the scheduler 105 and the facility coordinator 115 according to some embodiments. The scheduler 105 may include a scheduler database 505, cloud gateway 510, and a scheduler processor 515. The scheduler database 505 may include any type of database including a cloud database. The scheduler database 505 may be located in one or more locations and may include a database of prescriptions, facility information and properties, constraints, algorithms, etc.

The cloud gateway 510 may include any type of communication interface that allows the scheduler 105 to communicate with the network 520. The network may include a wireless connection such as, for example, a 4G or 5G network (or similar), an LTE network, a satellite network, etc. The network may include the Internet.

The scheduler processor 515 may include any or all elements of computational system 600 shown in FIG. 6. The scheduler processor 515 may create various prescriptions based on various parameters such as, for example, power demands, cost savings, etc. The scheduler processor 515 may communicate prescriptions to one or more facility coordinators 115 via the cloud gateway. The scheduler processor 515 may communicate with the scheduler database 505 via the cloud gateway.

The facility coordinator 115 may communicate with the scheduler 105 via a number of different pathways. For example, the facility coordinator 115 may request or receive facility updates via block 520. These facility updates may include constraint updates, firmware updates, software updates, data collection cadence, etc. The updates may be stored in a facility database 525, which may include a local or cloud database. Block 520 may communicate with the scheduler via a facility update communication channel. The facility update communication channel may require block 520 to request facility updates, and in response the scheduler may push facility updates. Alternatively or additionally, facility updates may be pushed to the facility coordinator 115.

As another example, the various sensors disposed throughout the industrial facility 110 may write sensor data to the facility database 525. The various sensors are represented by block 540 showing the sensors recording sensor data on a known cadence. Sensor data may be posted to the scheduler via block 530. The data communication channel may be a one-way communication channel from the facility coordinator 115 to the scheduler 105. Data may be pushed from the facility coordinator 115 to the scheduler 105 via the data communication channel. Alternatively or additionally, data may be requested by the scheduler 105 via the data communication channel.

As another example, prescriptions may be requested or received via block 535. For example, a facility coordinator may request a prescription from the scheduler 105 and in response the scheduler may send a prescription via the prescription communication channel. Received prescription may be stored in the facility database 525.

The various communication channels, the prescription communication channel, the data communication channel, and the facility update communication channel, may be separate communication channels or a shared channel. Regardless, the process for receiving facility updates, posting data to the scheduler, or requesting and receiving prescriptions may operate independent relative to one another. For instance, data may be collected from the sensors and posted to the scheduler 105 independent from prescriptions being received from the scheduler and the application of a prescription.

The computational system 600, shown in FIG. 6 can be used to perform any of the embodiments of the invention. For example, computational system 600 can be used to execute process 200, process 400, or process 500. As another example, computational system 600 can be used to perform any calculation, identification and/or determination described here. The computational system 600 includes hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 630 may permit data to be exchanged with a network (such as the network described below, to name one example), and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

FIG. 7 is a block diagram of an example constraint hierarchy 700 according to some embodiments. This constraint hierarchy shows a number of constraints arranged in blocks showing a progression of constraints from those that are rarely (or never) changed or adjusted to those constraints that may be frequently or regularly changed or adjusted. The block diagram also shows the priority of ensuring certain constraints are held within proper or safe bounds.

Physical constraints, for example, may never be changed. Physical constraints may include the maximum fan speed and the maximum vessel level. Under a corrective action, these constraints may have the highest priority for ensuring that these bounds are held within the bounds defined by the constraints.

Safety constraints, for example, may be rarely changed and have high priority although lower priority than the physical constraints. Safety constraints may include vessel pressure constraints (e.g., a maximum vessel pressure) and compressor oil pressure constraint (e.g., a maximum vessel pressure).

Operational constraints, for example, may be occasionally changed and more often changed than the physical constraints or the safety constraints. Operational constraints may include food temperature limits (e.g., these may vary depending on food type), cooling efficiency constraints, and time since the last defrost constraints.

Other constraints, for example, may include facility power draw limits, compressor power draw limits, condenser head pressure limits, and evaporator fan speed. These constraints may be changed frequently. In some embodiments, the condenser head pressure limits may seek to maintain a specific difference between a wet-bulb temperature and the condenser temp (which is representative of the condenser pressure).

In some embodiments, a constraint may have either or both a fixed and a variable component and/or multiple constraints that are physical, safety, operational, or other constraints. For example, a condenser head pressure may have a fixed physical constraint such as, for example, the condenser head pressure must be kept below 5 torr to ensure that the condenser is operated within safe parameters. The condenser head may also have a variable operational constraint such as, for example, during peak power or heat times the condenser head pressure may have a constraint to be kept below 3 torr and during non-peak power times or cooler times the condenser head pressure may have a constraint to be kept below 6 torr. During peak power or heat times the operational constraint may take precedent. During non-peak or cooler times the safety constraint may take precedent.

In some embodiments, the priority for ensuring a constraint is not exceeded may be inversely proportional to the frequency of change.

Unless otherwise specified, the term "substantially" means within 5% or 10% of the value referred to or within manufacturing tolerances. Unless otherwise specified, the term "about" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce altera- That which is claimed:

1. A system comprising:
a plurality of controllable devices;
a plurality of sensors configured to measure aspects of a facility environment; and
a facility coordinator in communication with the plurality of controllable devices and the plurality of environmental sensors, the facility coordinator is configured to:
receive at the facility coordinator a facility prescription from a remote server, wherein the facility prescription comprises a first set point that is an environmental condition to be met within the facility by operation of the plurality of controllable devices;
translate at the facility coordinator the facility prescription into one or more commands understood by one or more of the plurality of controllable devices;
communicate the one or more commands from the facility coordinator to the one or more controllable devices;
receive at the facility coordinator sensor data from one or more of the plurality of sensors;
determine at the facility coordinator based on the sensor data whether an aspect of an environment or one or more of the controllable devices violates one or more constraints; and
in the event the environment or one or more of the controllable devices violates one or more constraints, determine at the facility coordinator a corrective action command and send the corrective action command to one or more of the plurality controllable devices;
wherein the one or more of the plurality of controllable devices implements the corrective action command.

2. The system according to claim 1, wherein the facility prescription comprises a second set point corresponding to either an environmental condition or an operational condition to be met by operation of the plurality of controllable devices.

3. The system according to claim 1, wherein the facility prescription includes two or more environmental set points or operational set points to be met by operation of the plurality of controllable devices.

4. The system according to claim 1, wherein the facility prescription comprises one or more set points corresponding to one or more environmental condition or operational condition, and the corrective action comprises adjusting the one or more set points.

5. The system according to claim 1,
wherein the plurality of controllable devices comprises at least one of an evaporator, a condenser, a plurality of fans, a vessel, and a pump; and
wherein the plurality of sensors comprise at least one of a thermometer and a pressure sensor.

6. The system according to claim 1,
wherein the prescription comprises a temperature set point;
wherein the plurality of controllable devices comprises an evaporator and an evaporator fan; and
wherein translating the facility prescription into one or more commands comprises translating the temperature set point into a command that will change a fan speed of the evaporator fan.

7. The system according to claim 1,
wherein the plurality of controllable devices comprises a vessel;
wherein the plurality of sensors comprises at least one vessel pressure sensor or vessel level sensor; and
wherein in the event the vessel pressure or vessel level is greater than a predetermined value, setting the corrective action command to a command that decreases the evaporator fan speed.

8. The system according to claim 1, wherein the facility coordinator is configured to: store the sensor data and communicate the sensor date to the scheduler.

9. The system according to claim 1, wherein one or more of the one or more controllable devices applies the one or more commands.

10. The system according to claim 1, wherein the facility prescription comprises a first set point and a second set point, wherein the second set point has priority over the first set point.

11. The system according to claim 10, wherein the corrective action command comprises a first corrective action associated with the first set point and a second corrective action associated with the second set point and the second corrective action is applied before the first corrective action.

12. The system according to claim 1, wherein the one or more constraints comprise a first constraint and a second constraint, wherein the second constraint has priority over the first constraint.

13. The system according to claim 1, wherein the one or more constraints comprise a first constraint and the facility prescription comprises a first set point, wherein first constraint has priority over the first set point.

14. A method comprising:
receiving at a facility coordinator a facility prescription from a remote server, wherein the facility prescription comprises a first set point that is an environmental condition to be met within the facility by operation of the plurality of controllable devices;
translating at the facility coordinator the facility prescription into one or more commands understood by one or more of a plurality of controllable devices;
communicating from the facility coordinator the one or more commands to the one or more controllable devices;
receiving at the facility coordinator sensor data from one or more of a plurality of sensors;
determining at the facility coordinator based on the sensor data whether an aspect of an environment or one or more of the controllable devices violates one or more constraints; and
in the event the environment or one or more of the controllable devices violates one or more constraints, determining at the facility coordinator a corrective action and sending corrective action commands to one or more of the plurality controllable devices.

15. The method according to claim 14, wherein the facility prescription comprises a first set point corresponding to an environmental condition to be met by operation of the plurality of controllable devices.

16. The method according to claim 15, wherein the facility prescription comprises a second set point corresponding to either an environmental condition or an operational condition to be met by operation of the plurality of controllable devices.

17. The method according to claim 14, wherein the facility prescription includes two or more environmental set points or operational set points to be met by operation of the plurality of controllable devices.

18. The method according to claim 14, wherein the facility prescription comprises one or more set points corresponding to one or more environmental condition or operational condition, and the corrective action comprises adjusting the one or more set points.

19. A system comprising:
  a facility coordinator in communication with a plurality of controllable devices and a plurality of sensors, the facility coordinator disposed at a facility with the controllable device and the plurality of sensors, the facility coordinator configured to:
    receive at the facility coordinator a facility prescription from a remote server, wherein the facility prescription comprises a first set point that is an environmental condition to be met within the facility by operation of the plurality of controllable devices;
    translate at the facility coordinator the facility prescription into a translated prescription that can be applied to the plurality of controllable devices;
    determine at the facility coordinator whether the translated prescription will violate a constraint associated with a first controllable device of the plurality of controllable devices;
    in the event the translated prescription is determined to violate the constraint associated with the first controllable device, modify at the facility coordinator the translated prescription to ensure that the application of the translated prescription will not violate the constraint associated with the first controllable device; and
    communicate the translated prescription from the facility coordinator to the first controllable device.

* * * * *